April 8, 1969 JAMES E. WEBB 3,437,903

ADMINISTRATOR OF THE NATIONAL AERONAUTICS AND SPACE ADMINISTRATION

PROTECTION FOR ENERGY CONVERSION SYSTEMS

Filed May 17, 1967

INVENTORS
Edward R. Pasciutti &
Michael W. Talbot

BY

ATTORNEYS

United States Patent Office 3,437,903
Patented Apr. 8, 1969

3,437,903
PROTECTION FOR ENERGY CONVERSION SYSTEMS

James E. Webb, Administrator of the National Aeronautics and Space Administration, with respect to an invention by Edward R. Pasciutti, Beltsville, and Michael W. Talbot, Greenbelt, Md.

Filed May 17, 1967, Ser. No. 640,781
Int. Cl. H02m *3/32*
U.S. Cl. 321—2 13 Claims

ABSTRACT OF THE DISCLOSURE

This invention is an apparatus for protecting a thermo-electric-generator source-power system against an abnormal load causing the thermal destruction of the generator or a voltage step-up converter used with the generator. A current feedback inverter is used to reflect the output voltage and current of the inverter back to the generator. During high-load or short-circuit conditions, Peltier cooling by electric heat pumping from the thermoelectric generator's hot junction to the radiator or cold sink cools the junction to prevent thermal destruction. During light-load or no-load conditions a sensing device ignites a shorting silicon-controlled rectifier to short the output of the inverter. This shorted output is reflected back to the thermoelectric generator and again Peltier cooling prevents thermal destruction.

The invention described herein was made in the performance of work under a NASA contract and is subject to the provisions of section 305 of the National Aeronautics and Space Act of 1958, Public Law 85–568 (72 Stat. 435; 42 U.S.C. 2457).

*Background of the invention*

In certain environments, it is necessary to provide a source of electric energy that will operate over a long period of time without requiring maintenance and requiring little or no fuel. The radioisotope-fueled or solar-heated thermoelectric generator is ideally suited for use in these environments such as on a spacecraft, for example. That is, a thermoelectric generator will generate electric power over long periods of time without requiring any maintenance and with the consumption of little or no fuel.

While the thermoelectric generators are mechanically well-suited for use in extreme environments, they have presented some problems. For example, the electric potential generated per couple of a thermoelectric generator is very small. Therefore, it is generally necessary to use an inverter to increase the voltage potential of the thermoelectric generator. Moreover, thermoelectric generators are subject to thermal destruction if they are open-circuited; that is, the temperature of the thermoelectric generators' hot junction increases to a destructive value if the open-circuited generator is not appropriately cooled. One method of cooling the junction is by withdrawing current from it to create a Peltier cooling effect. This invention is concerned with an apparatus that creates such a current withdrawal.

In general, a thermoelectric generator generates electric power that has a linear inverse-voltage-current characteristic. That is, as the output voltage rises, the output current drops by a linear amount and vice versa. However, Peltier cooling depends upon the withdrawal of current from the junction. Hence, as the output voltage rises the amount of Peltier cooling decreases because the amount of current decreases. Consequently, for an open circuit condition, no Peltier cooling occurs because no current is withdrawn and, the thermoelectric device may overheat and be destroyed. That is, this temperature increase may destroy both the thermoelectric generators' components and junctions, or, it may destroy or degrade their ability to function in accordance with their design.

One prior art method of preventing thermal destruction has been the application of a dissipative shunt regulator to the output of either the thermoelectric generator or the inverter. However, this solution has not been entirely satisfactory. Specifically, the shunt regulator dissipates heat. In a spacecraft, for example, this heat is dissipated inside of the craft. This dissipation is undesirable, because it disrupts the heat balance of the spacecraft and adds heat to the interior of the craft. Adding heat to the craft's interior raises the thermal requirements of the crafts' components, both mechanical and electrical.

It is an object of this invention to provide a new and improved protection system for a power limited source of electric power.

It is another object of this invention to provide a new and improved protective system for a thermoelectric generator that is simple and uncomplicated.

It is a still further object of this invention to provide a new and improved system for preventing the thermal destruction of a thermoelectric generator.

It is still another object of this invention to provide a new and improved system for preventing the thermal destruction of a thermoelectric generator by Peltier cooling.

It is yet another object of this invention to provide a system that prevents the thermal destruction of a power limited source of electric power, utilizes the inherent resistance of the source to regulate the output voltage, and is essentially non-dissipative external to the source terminals.

*Summary of the invention*

In accordance with a principle of the invention a current feedback inverter is connected to the output of the thermoelectric generator. The current feedback inverter feeds back a base drive signal directly proportional to the output current. This signal controls the magnitude of the current passed by the inverter. Hence, it controls the current drawn from the thermoelectric source. And, as the output voltage drops, the output current increases. This increase in output current increases the Peltier cooling. In this manner a short-circuited output voltage provides maximum Peltier cooling to the thermoelectric generators.

In accordance with a further principle of this invention a shorting apparatus is connected to the output of the inverter. When the output voltage rises to a high value, approaching open-circuit voltage, and the output current correspondingly drops to a low value, the shorting device shorts the output. This shorted output draws the maximum current from the inverter and hence the maximum current from the thermoelectric generator. This maximum current withdrawal provides maximum Peltier cooling to the thermoelectric generator and prevents its thermal destruction.

It will be appreciated by those skilled in the art that the invention corrects the deficiencies of prior art power systems using thermoelectric generator power sources by enabling minimal heat energy dissipation external to the thermoelectric generator output terminals. Any heat dissipation requirements due to output unloading are electrically heat pumped to the thermoelectric generator's cold sink or radiator. Since the cold sink or radiator is at a high temperature, the heat disposal problem, especially in the vacuum of outer space, is greatly reduced.

It will also be appreciated by those skilled in the art that the invention as herein described is not limited to use with thermoelectric generators. Rather, the invention is suitable for use with any power-limited source; that is, a source whose voltage-current characteristic is approximately a linear inverse relationship. Provided, a load related electrical heat pumping Peltier effect enables some temperature control of the junctions or emitter-collector electrodes. One example of such a device is the thermionic diode.

*Brief description of the drawings*

The foregoing objects and many of the attendant advantages of this invention will become more readily appreciated as the same becomes better understood by reference to the following detailed description when taken in conjunction with the accompanying drawings wherein.

*Description of the preferred embodiments*

Figures 1, 2, 3:
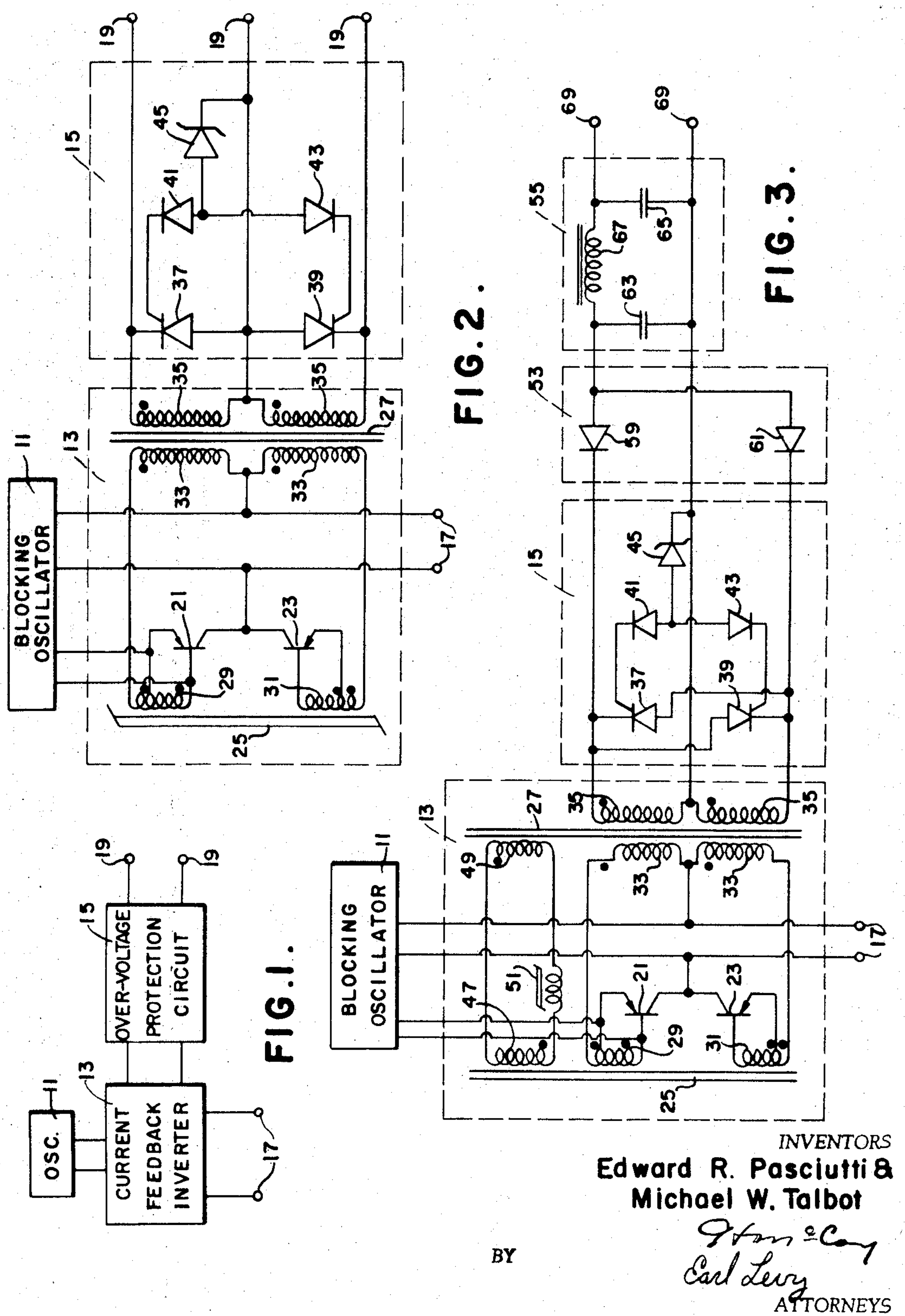
FIG. 1 is a block diagram illustrating the overall system of the invention.
FIG. 2 is a partially schematic and partially block diagram illustrating one embodiment of the invention.
FIG. 3 is a partially schematic and partially block diagram illustrating a second embodiment of the invention.

FIG. 1 is a block diagram of the invention and comprises an oscillator 11, a current feedback inverter 13, and a over-voltage protection circuit 15. A pair of input terminals 17, adapted for connection to a thermoelectric generator are connected to the inverter 13. The output of the oscillator 11 is also connected to the inverter 13, and, the output of the inverter is connected to the input of the over-voltage protection circuit 15. Finally, the output of the over-voltage protection circuit is connected to a pair of output terminals 19.

Preferably, the oscillator 11 is a blocking oscillator that, as hereinafter described, initiates the inverting action of the inverter, and after starting the inverter, is automatically biased off. The inverter 13 is adapted to invert the voltage from the thermoelectric generator and increases its magnitude. This voltage is applied through the protection circuit to the output terminals 19.

In operation, the current feedback inverter in combination with Peltier cooling cools the thermoelectric generator for all conditions except an open circuit or light load condition. That is, the current feedback inverter feeds back a base drive current signal that causes an increase in output current with a decrease in output voltage (increased load) and, when the current increases the amount of Peltier cooling increases. However, when the output voltage increases the output current decreases and, hence, the amount of Peltier cooling decreases. When this condition becomes critical, the over-voltage protection circuit becomes operative. Specifically, when a near open circuit conditions occurs the protection circuit 15 adapted to short-circuit the output. This short circuit provides a condition similar to a load short-circuit; that is, it creates maximum current withdrawal. This current withdrawal is fed back through the inverter to create maximum Peltier cooling because maximum Peltier cooling occurs for a short-circuit condition. Whether this is load short-circuit condition or a short-circuit created by an open circuit operating the protective circuit makes no difference.

FIG. 2 is a partially block and partially schematic diagram of one embodiment of the invention. The FIG. 2 embodiment comprises the blocking oscillator 11, the current feedback inverter 13, and the protection circuit 15. The current feedback inverter 13 comprises a first transistor 21, a second transistor 23, a first transformer 25, and a second transformer 27. The first transformer 25 is saturable and has a pair of windings 29 and 31. The second transformer has a center tapped input winding 33 and a center tapped output winding 35.

The input terminals 17 are connected to the input of the blocking oscillator 11. Further, one input terminal is connected to the center tap of the input winding of the second transformer 27, and the other input terminal is connected to the collectors of the first and second transistors 21 and 23. The base of the first transistor 21 is connected to one end of the first winding 29 of the first transformer 25 and the base of the second transistor 23 is connected to one end of the second winding 31 of the first transformer. The other end of the first winding 29 is connected to one end of the input winding 33 of the second transformer 27, and the other end of the second winding 31 is connected to the other end of the input winding 33. The emitter of the first transistor 21 is connected to the point intermediate the ends of the first winding 29 of the first saturable transformer and the emitter of the second transistor 23 is connected to a point intermediate the ends of a second winding 31. The output from the blocking oscillator is connected across the emitter-base junction of the first transistor 21.

The over-voltage protection circuit 15 illustrated in FIG. 2 comprises first and second silicon-controlled rectifiers 37 and 39, first and second diodes 41 and 43, and a Zener diode 45. The center tap of the output winding 35 of the second transformer 27 is connected to the anodes of the first and second silicon-controlled rectifiers and to the cathode of the Zener diode. In addition, the center tap is connected to an output terminal 19. One end of the second winding 35 is connected to the cathode of the first silicon-controlled rectifier 37 and to an output terminal 19. The other end of the second winding 35 is connected to the cathode of the second silicon-controlled rectifier 39 and to a further output terminal 19. The gate of the first silicon-controlled rectifier 37 is connected to the cathode of the first diode 41 and the gate of the second silicon-controlled rectifier 39 is connected to the cathode of the second diode 43. The anodes of the first and second diodes are connected together and to the anode of the Zener diode 45.

In operation, the inverter 13 operates in a conventional primary transformer winding-current feedback with saturable base transformer manner; the blocking oscillator 11 initially triggers the first transistor 21 to start the inverting action. As current starts to flow in the collector circuit of the first transistor, current through the first winding 29 causes the first transformer 25 to saturate in one direction. When the first transformer reaches a sufficient level of saturation it turns the first transistor 21 off and turns the second transistor 23 on. Thereafter, current through the second winding 31 causes the first transformer to saturate in the opposite direction. When saturation in the opposite direction is reached the second transistor is turned off and the first transistor is turned on. This alternate switching on and off of the first and second transistors creates the inversion action. The second transformer's voltage step-up ratio increases the voltage level of the output voltage. The current feedback drive keeps the conducting transistor well into saturation regardless of the current level demand, enabling low dissipative operation for all load current demands including as a maximum the short circuit current capability of the thermoelectric generator. The current feedback also reverse biases the nonconducting transistor.

It will be appreciated that the current feedback inverter prevents the thermal destruction of the thermoelectric generator for a low output voltage or short circuit load condition. Specifically, because of the inverse voltage-current characteristic of the thermoelectric generator, as the output voltage decreases, the output current increases, this current increase is fed back to the transistors to further increase the output current. And, increasing the output current increases Peltier cooling of the thermoelectric generator.

When the output voltage approaches a high value due to the resistance of the load increasing (toward an open circuit condition), for example, the protection circuit protects the thermoelectric generator. That is, as the output voltage approaches a high value, its current drops off. This drop in current decreases Peltier cooling of the thermoelectric generator. When a critical condition is reached, it is necessary to increase the output current to increase Peltier cooling and prevent thermal destruction of the thermoelectric generator. The over-voltage protection circuit performs this function.

Specifically, when the critical condition occurs, the Zener diode 45 breaks down and, when the Zener diode breaks down, one of the silicon-controlled rectifiers is triggered on. Because of the inverted output voltage which SCR is triggered on depends on the direction of the output voltage at the time the critical condition is reached. When the inverter switches to its opposite state and a critical voltage is reached the opposite SCR is triggered on.

Triggering on the SCR's shorts the output winding 35 of the second transformer 27. This short creates maximum output current resulting in maximum Peltier cooling for the thermoelectric generator. That is, the large output current applies a large base current to the conducting transistor to create a high collector current. This high current creates maximum Peltier cooling of the thermoelectric generator.

To better understand the operation of the silicon-controlled rectifiers 37 and 39 in conjunction with the Zener diode 45, assume that the voltage on the cathode of the first silicon-controlled rectifier 37 approaches a critical negative condition. When this negative condition occurs a high positive voltage is applied to the cathode of the Zener diode 45. This high voltage breaks down the Zener diode and allows a gate current to flow to the first silicon-controlled rectifier through the first diode 41. This current triggers the first SCR on. When the first SCR is triggered on it shorts the upper half of the output winding 35. This short as hereinabove described creates maximum Peltier cooling of the thermoelectric generator. During this period the second SCR 39 is not triggered on because it is back-biased; that is, the voltage at its cathode is more positive than the voltage at its anode. However, on the following cycle if the voltage at the cathode of the second silicon-controlled rectifier reaches an undesired level the Zener diode again breaks down. When this breakdown occurs, current flows through the second diode 43 to the gate of the second SCR 39 and triggers it on. The second SCR then shorts the lower half of the output winding of the second transformer. While this is occurring the first SCR is off because its anode-cathode circuit is reverse biased.

It will be appreicated that this alternate back and forth switching and reverse-biasing allows the system to immediately recover if the output voltage drops below the critical value. That is, the SCR following a critical voltage condition is not triggered on if a further critical breakdown voltage is not applied across the Zener diode. Therefore, the system can recover from a short condition to an operative condition in one half of a cycle.

It is essential that the impedance presented to the thermoelectric generator by the inverter be low. That is, it is essential that the losses in the inverter be low. The current feedback inverter illustrated in FIG. 2 enables the power transistors 21 and 23 of the inverter to provide a base drive that maintains the impedance of the transistors low. That is, when the output current of the inverter is high the current applied to the bases of the transistors is high. The switching transistor therefore has a high-collector current flow. This high current flow results in low collector-to-emitter impedance. Hence, the inverter only adds a small impedance to the impedance presented to the thermoelectric generator from the output through the inverter.

The operating frequency of the oscillator-inverter 13 of FIG. 2 is determined by the saturation time of the saturable base current feedback transformer 25. Magnetic saturation of transformer 25 is a function of the base to emitter voltage of the conducting inverter transistor, either 21 or 23, as well as transformer 25 design. Since the base to emitter voltage rises only slightly with increased load, the operating frequency is relatively constant rising somewhat with increased loading. This constant frequency embodiment of FIG. 2 has an advantage in a regulated output voltage application because the output filter size can be made small.

As hereinabove described, Peltier cooling occurs by electrical heat pumping from the hot junction to the thermoelectric generator cold sink. At the cold sink it is rejected. In a spacecraft the cold sink would be located on the outside of the craft, hence, the heat is rejected into space, for example. Rejection of heat by radiation to space is more effectively accomplished at the higher temperature of the thermoelectric generator radiator than at the relatively lower temperature of a dissipative shunt regulator attached to the craft's structure as in prior art devices.

Turning now to the embodiment of the invention illustrated in FIG. 3, the inverter 13 illustrated in FIG. 3 is a current feedback inverter (base drive current proportional to load current) with voltage feedback controlled switching (frequency proportioned to input voltage). Therefore, the inverter illustrated in FIG. 3 is also voltage dependent; that is, the input voltage from the thermoelectric generator determines the frequency of the inverter. Hence, as the input voltage drops (because of a shorted output high current condition) the frequency drops. This low frequency also reduces overall switching losses. Hence, the overall impedance presented to the thermoelectric generator is low. This low impedance provides maximum current withdrawal to provide maximum Peltier cooling.

More specifically, the inverter illustrated in FIG. 3 is similar to the inverter illustrated in FIG. 2 with the addition of a third winding 47 on the first transformer 25 and a third winding 49 on the second saturable transformer 27. The first transformer 25 is not saturable in FIG. 3 as it was in FIG. 2. One end of the third winding 47 of the first transformer is connected to one end of the third winding 49 of the second transformer. The other end of the third winding 47 of the first transformer 25 is connected through a saturable inductor 51 to the other end of the third winding 49 of the second transformer 27.

The inverter illustrated in FIG. 3 has a frequency that is dependent upon the saturable effect of the saturable inductor 51. That is, the frequency of switching is determined by the saturable inductive properties of the saturable inductor 51 and not dependent on the saturating properties of the first transformer. More specifically, the voltage induced in winding 49 of transformer 27 is applied to saturable reactor 51 through winding 47 of transformer 25. When saturable reactor 51 saturates current flows in the frequency determining network loop composed of winding 49 of transformer 27, winding 47 of transformer 25, and saturable reactor 51. This current flow induces a reverse bias voltage from base to emitter of the conducting inverter transistor, and forward biasing of the nonconducting transistor. This forces inverter switchover or reversal and the saturable inductor 51 is then reset and the operation repeats in the opposite direction, creating the inversion action.

In addition to changes in the inverter, the over-voltage protection circuit 15 illustrated in FIG. 3 is slightly changed from the over-voltage protective circuit illustrated in FIG. 2. Specifically, instead of the first and second silicon-controlled rectifiers 37 and 39 having their anodes connected together and to the center tap of the output winding 35, they are connected to opposite ends of the output winding. That is, the first SCR 37 is connected across the total output winding 35 and the second SCR 39 is connected across the total output winding 35. However, the polarity of the SCR's is opposite; hence, when the SCR's are triggered "ON" they short all of the output winding 35 rather than half of it.

In addition to the oscillator, inverter, and protection circuit, the system illustrated in FIG. 3 also comprises a rectifier network 53 and a filter 55.

The rectifier 53 comprises third and fourth diodes 59 and 61. The cathode of the third diode 59 is connected to one end of the output winding 35 of the second transformer 27, and the cathode of the fourth diode 61 is connected to the other end of the second winding 35. The anodes of the third and fourth diodes are connected together.

The filter 55 comprises first and second capacitors 63 and 65 and an inductor 67. The capacitors each have one end connected to an end of the inductor and their other ends are connected together and to the center tap of the output winding 35 of the second transformer 27. The junction between the first capacitor 63 and the inductor 67 is connected to the anodes of the third and fourth diodes 59 and 61. Hence, the filter 55 is a conventional $\pi$ filter. The output from the filter 55 is connected to a pair of output terminals 69.

With respect to the inverter and the over-voltage protective circuit, the system illustrated in FIG. 3 operates in the same manner as the system illustrated in FIG. 2. That is, when the output voltage from the inverter approaches a high critical value, the Zener diode breaks down and triggers "ON" one or the other of the SCR's. The triggered SCR shorts the output winding 35 of the second transformer and creates a large output current. This current flow is reflected back through the inverter to the thermoelectric generator. And, this large output current draws a large current from the thermoelectric generator to provide maximum Peltier cooling to the generator. Again, the SCR's are alternately switched on and off on alternative half cycles so that when the output voltage drops below the harmful level the SCR's are maintained off.

The third and fourth diodes 59 and 61 operate as a conventional rectifier and rectify the output from the inverter circuit if passed by the protective circuit. This rectifical output is pulsating DC and it is filtered by the filter 55 and applied to the output terminals 69.

The selection of the Zener diode 45 breakdown voltage rating results in two meaningful modes of operation. The mode previously discussed in detail uses a Zener rating somewhat higher than the stepped up thermoelectric generator output voltage occurring at matched load maximum power output conditions. Thus the over-voltage protection circuit is not triggered until the output load has been reduced considerably. In this mode, for a considerable load change, the output voltage at terminals 69 follows directly in inherent voltage regulation of the thermoelectric generator source.

In addition to the primary protection mode provided by the invention, a secondary output voltage regulation mode can be achieved by the Zener diode 45 voltage being selected only slightly higher than the stepped up voltage occurring at the matched load maximum power point output voltage of the thermoelectric generator. Then for loadings between open circuit to approximately the matched load maximum power output condition the average output voltage at terminals 69 will be roughly regulated. The output voltage regulation is however lost as the loading is increased above the maximum power output matched load value because of the maximum power output power limitations of the source. Peltier cooling protection is however maintained for all output loading conditions, for both operating modes.

It will be appreciated by those skilled in the art and others that the invention provides a simple apparatus for prevening the thermal destruction of a thermoelectric generator. Specifically, a simple feedback inverter reflects the output current back to the generator to create Peltier cooling under normal or low output voltage conditions. When the output voltage rises to a high value and the output current drops to a correspondingly low value a simple protective circuit is triggered to short the output creating a high current and maximum Peltier cooling. Further, by picking a predetermined value, the trigger element for the protective circuit operates as a nondissipative regulator as well as a protective circuit.

While preferred embodiments of the invention have been disclosed, it will be apparent to those skilled in the art that within the scope of the invention various changes can be made such as using NPN transistors rather than the PNP transistors; for example. Further, the rectifier and filter network connected to the output of the protective circuit of the embodiment illustrated in FIG. 3 will work equally as well with the embodiment illustrated in FIG. 2.

What is claimed is:

1. Apparatus for protecting a thermoelectric generator from thermal destruction comprising:
current feedback inverter means having a pair of input terminals suitable for connection to a thermoelectric generator for inverting the output voltage from said thermoelectric generator;
starting means connected to said current feedback inverter means for starting the inverting action of said current feedback inverter means; and
protection circuit means connected to the output of said current feedback inverter means for shorting the output of said current feedback inverter means when the output voltage of said current feedback inverter means reaches a predetermined level.

2. Apparatus as claimed in claim 1 wherein said current feedback inverter means includes at least one transformer and wherein said protection circuit means includes at least one silicon-controlled rectifier.

3. Apparatus as claimed in claim 2 wherein said feedback inverter means comprises:
first and second transformers;
first and second transistors;
said first transformer having a pair of windings and said second transformer having an input and an output winding each of which is center tapped;
one end of one winding of said first transformer connected to one end of the input winding of said second transformer and one end of the second winding of said first transformer connected to the other end of the input winding of said second transformer;
the base of said first transistor connected to the other end of the first winding of said first transformer and the emitter of said first transistor connected to a point intermediate the ends of the first winding of said transformer;
the base of said second transistor connected to the other end of the second winding of said first transformer and the emitter of said second transistor connected to a point intermediate the ends of the second winding of said first transformer;
the collectors of said first and second transistors connected together and to one input terminal;
the center tap of said input winding of said second transformer connected to a second input terminal;
said input terminals also connected to the input of said starting means;
the output of said starting means connected across the base emitter junction of said first transistor; and
the output winding of said second transformer connected to said protection circuit means.

4. Apparatus as claimed in claim 3 wherein said protection circuit means comprises:
first and second silicon-controlled rectifiers;
first and second diodes;
a Zener diode;
the cathode of said first silicon-controlled rectifier connected to one end of the output winding of said second transformer and the cathode of said second silicon-controlled rectifier connected to the other end of the output winding of said second transformer;

the andoes of said first and second silicon-controlled rectifiers connected together and to the center tap of theo utput winding of said second transformer;

the cathode of said first diode connected to the gate of said first silicon-controlled rectifier and the cathode of said second diode connected to the gate of said second silicon-controlled rectifier;

the anodes of said first and second diodes connected together and to the anode of said Zener diode; and the cathode of said Zener diode connected to the center tap of said output winding of said second transformer.

5. Apparatus as claimed in claim 4 wherein said first transformer is a saturable transformer.

6. Apparatus as claimed in claim 5 wherein said starting means comprises a blocking oscillator.

7. Apparatus as claimed in claim 6 including a rectifier connected to the output of said protective circuit means.

8. Apparatus as claimed in claim 7 including a filter connected to the otuput of said rectifier means.

9. Apparatus as claimed in claim 3 wherein said first transformer includes a third winding, wherein said second transformer includes a third winding and wherein said feedback inverter also includes a saturable inductor;

one end of said third winding of said first transformer connected to one end of said third winding of said second transformer; and the other end of said third winding of said first transformer connected to one end of said saturable inductor and the other end of said saturable inductor connected to the other end of the third winding of said second transformer.

10. Apparatus as claimed in claim 9 wherein said protection circuit means comprises:

first and second silicon-controlled rectifiers;

first and second diodes;

a Zener diode;

the cathode of said first silicon-controlled rectifier connected to one end of the output winding of said second transformer and the cathode of said second silicon-controlled rectifier connected to the other end of the output winding of said second transformer;

the anodes of said first and second silicon-controlled rectifiers connected to the opposite ends of the output winding of said second transformer from their cathodes;

the cathode of said first diode connected to the gate of said first silicon-controlled rectifier and the cathode of said second diode connected to the gate of said second silicon-controlled rectifier;

the anodes of said first and second diodes connected together and to the anode of said Zener diode; and the cathode of said Zener diode connected to the center tap of said output winding of said second transformer.

11. Apparatus as claimed in claim 10 wherein said starting means comprises a blocking oscillator.

12. Apparatus as claimed in claim 11 including a rectifier means connected to the output of said protective circuit means.

13. Apparatus as claimed in claim 12 including a filter connected to the output of said rectifier means.

References Cited

UNITED STATES PATENTS

| | | | |
|---|---|---|---|
| 3,222,535 | 12/1965 | Engelhardt | 321—2 X |
| 3,277,360 | 10/1966 | Carmichael | 321—16 |
| 3,323,075 | 5/1967 | Lingle | 331—113.1 |
| 3,384,806 | 5/1968 | Hartman | 322—2 |
| 3,391,322 | 7/1968 | Findley et al. | 321—2 |

LEE T. HIX, *Primary Examiner.*

W. H. BEHA, JR., *Assistant Examiner.*

U.S. Cl. X.R.

321—14, 16; 322—2